US009077631B2

(12) United States Patent
Neisinger et al.

(10) Patent No.: US 9,077,631 B2
(45) Date of Patent: Jul. 7, 2015

(54) NETWORK CAPACITY PLANNING

(71) Applicant: Verizon Patent and Licensing Inc., Basking Ridge, NJ (US)

(72) Inventors: Chris S. Neisinger, Danville, CA (US); Brian Olson, Clayton, CA (US); Emerando M. Delos Reyes, Pleasant Hill, CA (US); David Chiang, Fremont, CA (US); Scott A. Townley, Gilbert, AZ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 299 days.

(21) Appl. No.: 13/644,838

(22) Filed: Oct. 4, 2012

(65) Prior Publication Data

US 2014/0101297 A1    Apr. 10, 2014

(51) Int. Cl.
*G06F 15/173*    (2006.01)
*H04L 12/24*    (2006.01)
*H04L 29/06*    (2006.01)
*H04L 12/26*    (2006.01)

(52) U.S. Cl.
CPC ........ *H04L 41/0893* (2013.01); *H04L 65/4084* (2013.01); *H04L 65/80* (2013.01); *H04L 41/5067* (2013.01); *H04L 43/026* (2013.01); *H04L 43/0829* (2013.01); *H04L 43/0852* (2013.01); *H04L 43/087* (2013.01); *H04L 43/16* (2013.01); *H04L 41/147* (2013.01); *H04L 41/0896* (2013.01)

(58) Field of Classification Search
None
See application file for complete search history.

(56) References Cited

U.S. PATENT DOCUMENTS

| 5,448,621 | A | * | 9/1995 | Knudsen | 455/427 |
| 6,996,374 | B1 | | 2/2006 | Bao et al. | |
| 7,933,557 | B1 | * | 4/2011 | Townley et al. | 455/67.11 |
| 2006/0245369 | A1 | * | 11/2006 | Schimmelpfeng et al. | 370/252 |
| 2008/0215704 | A1 | * | 9/2008 | Curcio et al. | 709/217 |
| 2013/0021933 | A1 | * | 1/2013 | Kovvali et al. | 370/252 |
| 2013/0279325 | A1 | * | 10/2013 | Dunne et al. | 370/228 |
| 2013/0310058 | A1 | * | 11/2013 | Ibrahim et al. | 455/452.1 |

* cited by examiner

*Primary Examiner* — Wing F Chan
*Assistant Examiner* — Padma Mundur

(57) ABSTRACT

A network device is configured to receive information relating to factors associated with quality of experience issues. The network device is configured to analyze the information. The network device is configured to predict that a quality of experience factor associated with a particular type of communication will exceed a threshold level a future time. The network device is configured to send a message to the device, the device generating a rule or policy; and the rule or policy instructing one or more other network devices to increase a capacity of the network to prevent the quality of experience factor from exceeding the threshold value at the future time.

20 Claims, 6 Drawing Sheets

NETWORK CAPACITY PLANNING

BACKGROUND

A network may provide service to a user device connected to the network. During the operation of the network, the network, or a part of the network, may reach its maximum capacity level. As the network, or part of the network, reaches, or exceeds, the maximum capacity level, the user, of the user device, may experience quality of experience (QoE) issues, such as delay, failure of service, and/or other issues.

DETAILED DESCRIPTION OF PREFERRED EMBODIMENTS

The following detailed description refers to the accompanying drawings. The same reference numbers in different drawings may identify the same or similar elements.

Systems and/or methods described herein may analyze information regarding the threshold level for a QoE factor for a particular type of communication; determine whether the QoE factor for the particular type of communication within the network has reached the threshold level and/or predict when the QoE factor for the particular type of communication in the network may reach the threshold level; and implement solutions to resolve any potential QoE issues by increasing the capacity level of the network.

Figure 1:
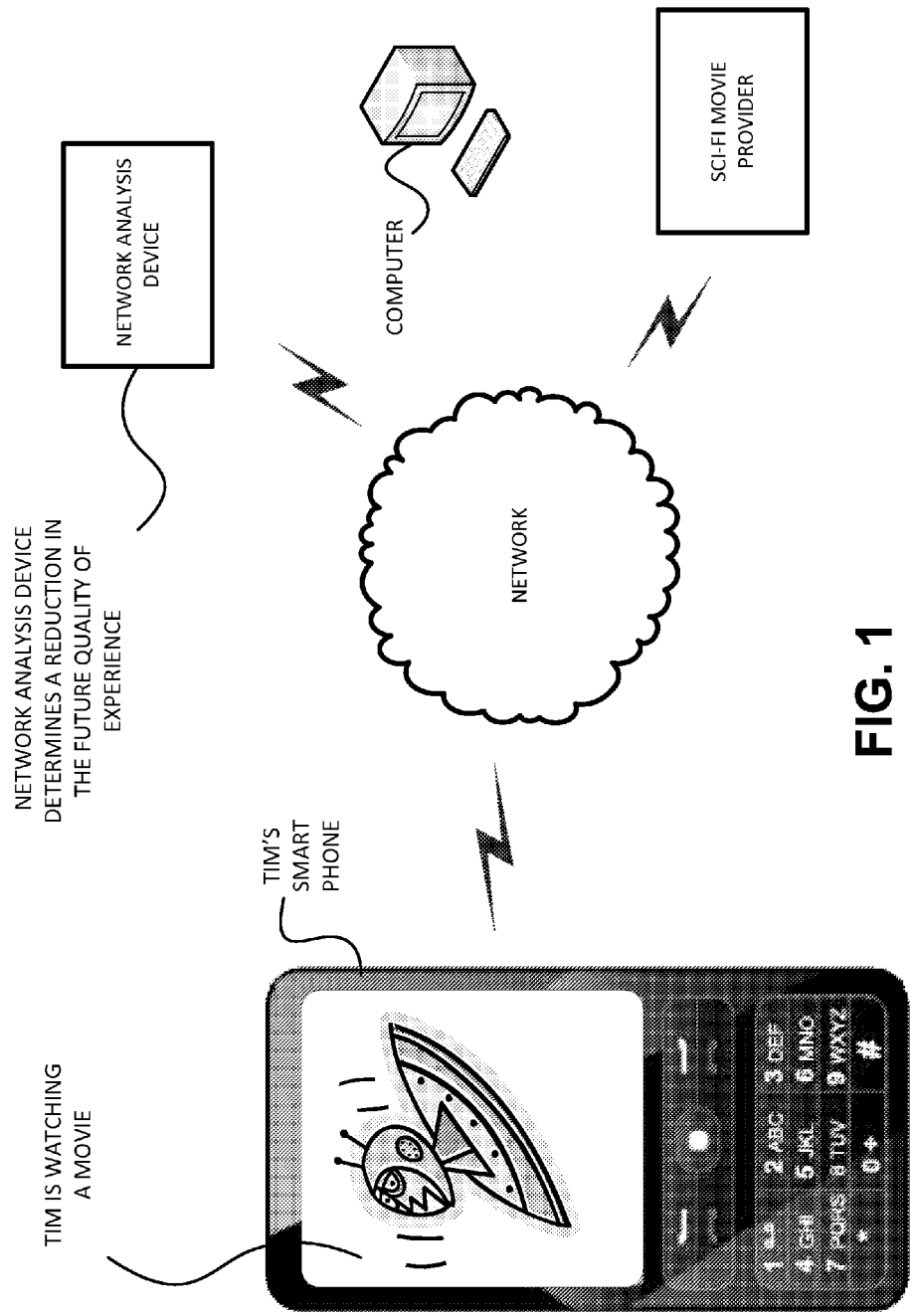
FIG. 1 is a diagram of an overview of an implementation described herein.

FIG. 1 is a diagram of an overview of an implementation described herein. As shown in FIG. 1, a user ("Tim") is using his smart phone (Tim's smart phone) to watch a movie that he is receiving from Sci-Fi movie provider via a network. As Tim is watching the movie, the network analysis device may be receiving information about the delay rates for streaming video content within a particular coverage area of the network. The network analysis device may receive communication information between different user devices associated with a particular coverage area of the network, including Tim's smart phone (which is being used to receive streaming video content) that is also located in that particular coverage area of the network. The network analysis device may analyze whether the delay rate for streaming video content in the particular coverage area of the network has exceeded a threshold level. The threshold level indicates the maximum level of the delay rate that is allowable before the user (Tim) begins to have QoE issues. The network analysis device may determine that the delay rate, for streaming video content, in the particular coverage area of the network has not reached the threshold level. The network analysis device may predict that the delay rate, for streaming video content, in the particular coverage area of the network may reach the threshold level within the next 24 hours. The network analysis device may send a message to a computer. The computer is associated with the network analysis device and the network service provider. A user, of the computer, may view the message (sent from the network analysis device) and may have different options on how to provide additional capacity, such as adding additional channels, to the particular coverage area of the network to prevent the delay rate from exceeding the threshold level as predicted within the next 24 hours.

As a result, a network may operate more efficiently based on an analysis system that is able to detect when users may experience QoE issues before a QoE factor exceeds a threshold level. With the ability to predict future QoE issues, the network may provide a greater level of QoE to the users of the network.

Figure 2:
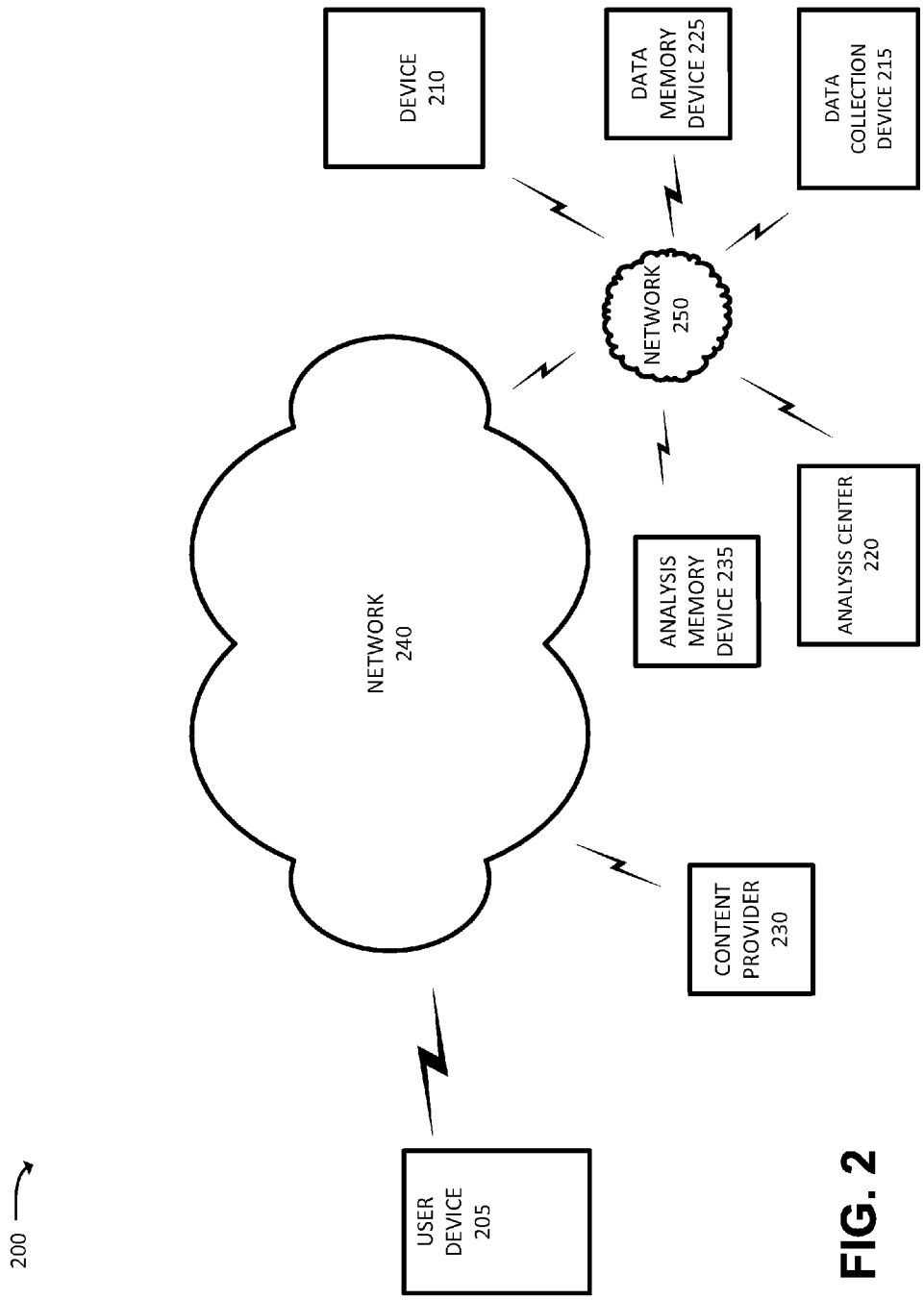
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 205, a device 210, a data collection device 215, an analysis center 220, a data memory device 225, a content provider 230, an analysis memory device 235, network 240, and a network 250.

User device 205 may include any computation or communication device, such as a wireless mobile communication device that is capable of communicating with a network (e.g., network 240 and/or network 250). For example, user device 205 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, a television, or another mobile, computation, or communication device.

User device 205 may include a variety of applications, such as, for example, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Device 210 may include any computation or communication device that is capable of communicating with a network (e.g., network 240 and/or network 250). Device 210 may include a computer, a laptop, a workstation, or another device capable of receiving information and displaying the information to a user of device 210.

Data collection device 215 may include one or more network devices, or other types of computation or communication devices, that gather, process, search, and/or provide information in a manner described herein. Data collection device 215 may request and/or receive information associated with the operation of network 240. Data collection device 215 may be a part of analysis center 220 or data collection device 215 may be a separate device than analysis center 220.

Analysis Center 220 may include one or more network devices, or other types of computation or communication devices, that gather, process, search, and/or provide information in a manner described herein. Analysis center 220 may analyze various issues relating to QoE factors that are associated with the capacity level of a network.

Data memory device 225 may include one or more memory, or network, devices that gather, process, store and/or provide information described herein. Data memory device 225 may store information collected by data collection device 215. Data memory device 225 may be a part of data collection device 215 or data memory device 225 may be a separate device than data collection device 215.

Content provider 230 may include one or more network devices, or other types of computation or communication devices that gather, process, and/or provide information in a manner described herein. For example content provider 230 may send, via network 240, content to user device 205. The content is intended to be broadly interpreted to include any computer readable data that may be transferred over a network. Content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream).

Analysis memory device 235 may include one or more memory, or network, devices that gather, process, store and/or provide information described herein. Analysis memory device 235 may receive analysis information from analysis center 220 and may store the analysis information and/or send the analysis information to device 210. Analysis memory device 235 may be part of analysis center 220 or analysis memory device 235 may be a separate device.

Network 240 and/or network 250 may include a cellular network, a public land mobile network (PLMN), a second generation (2G) network, a third generation (3G) network, a fourth generation (4G) network, a fifth generation (5G) network and/or another network. Additionally, or alternatively, network 240 and/or network 250 may include a local area network (LAN), wide area network (WAN), a metropolitan network (MAN), a telephone network (e.g., the Public Switched Telephone Network (PSTN)), an ad hoc network, an intranet, the Internet, a satellite network, a GPS network, a fiber optic-based network, and/or combination of these or other types of networks. Additionally, or alternatively, network 240 and/or network 250 may support secure communications via a private network (e.g., a virtual private network (VPN) or a private IP VPN (PIP VPN), and/or secure communications via a public network.

Additionally, or alternatively, network 240 and/or network 250 may include a radio access network (RAN), such as a long term evolution (LTE) network, that may include a variety of components to facilitate mobile communications, such as antennas, base stations, mobile switching centers, and interfaces with Public Switched Telephone Networks (PSTNs) and/or packet data servicing nodes (PDSNs).

Network 240 and network 250 may be the separate networks, or network 240 and network 250 may be part of the same network.

In some implementations, communications between user device 205 and other devices (associated with network 240 and/or network 250) may be via data packets. The data packets may be defined as Internet Protocol (IP) data packets (associated with IP version 4 (IPv4), IP version 6 (IPv6), or any other IP version), session initiation protocol (SIP) data packets, or some other form or arrangement of data.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
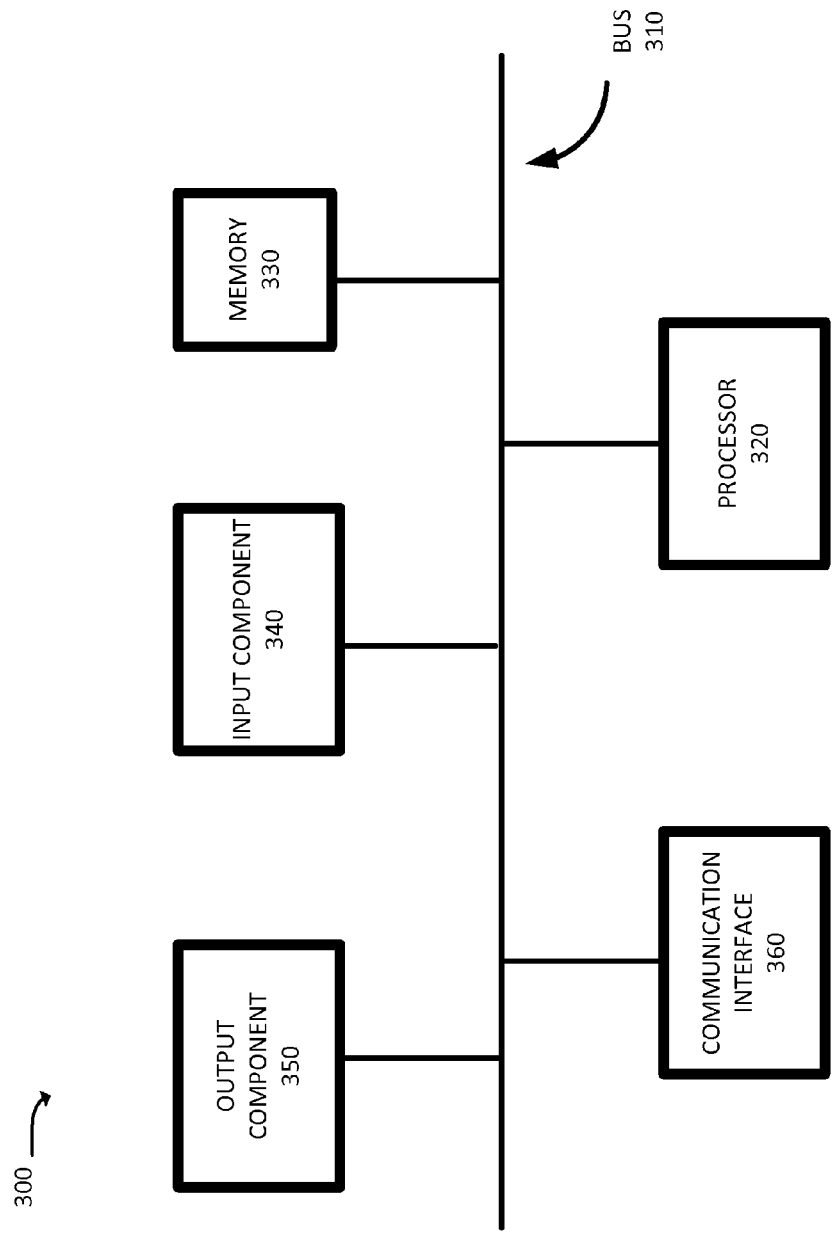
FIG. 3 is a diagram of example components of one or more devices of FIGS. 1 and 2.

FIG. 3 is a diagram of example components of a device 300. Device 300 may correspond to user device 205, device 210, data collection device 215, analysis center 220, data memory device 225, content provider 230, and/or analysis memory device 235. Additionally, or alternatively, each of user device 205, device 210, data collection device 215, data memory device 225, analysis center 220, content provider 230, and/or analysis memory device 235 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with other networks and/or devices connected to network 240 and/or network 250.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
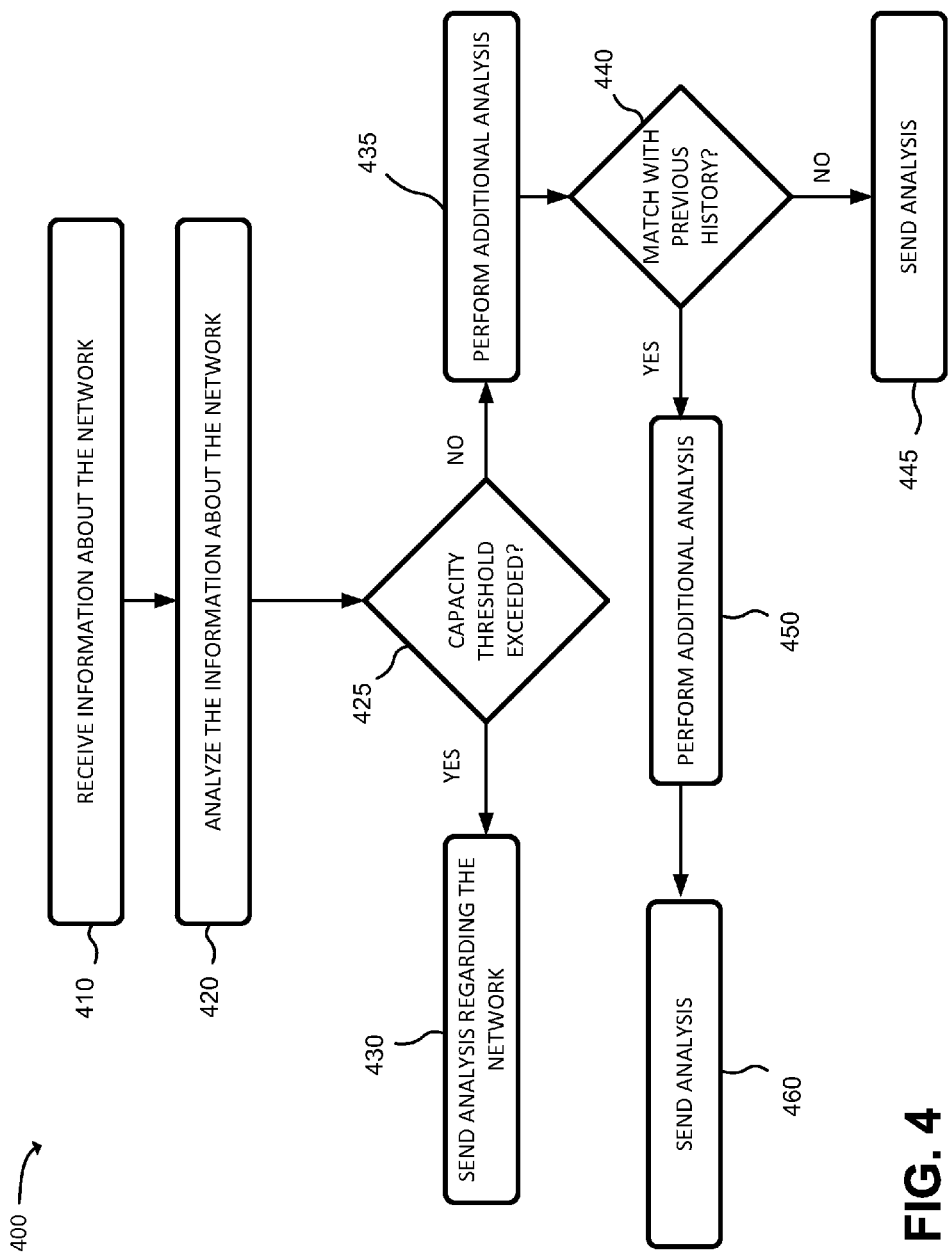
FIG. 4 is a flow chart of an example process for analyzing the capacity of a network.

FIG. 4 is a flow chart of an example process 400 for analyzing the capacity of a network. In one implementation, process 400 may be performed by analysis center 220. In another example implementation, one or more blocks of process 400 may be performed by one or more other devices, such as data collection device 215 and/or device 210.

Process 400 may include receiving information about the network (block 410). Analysis center 220 may receive information about network 240 from data memory device 225. Data memory device 225 may receive the information from data collection device 215. Data collection device 215 may include or interact with different types of data collection applications to receive information about different network devices and/or interfaces associated with a session between user device 205 and network 240. These different types of data collection applications may send requests for information to different network devices within network 240 and/or different interfaces between different network devices for information about network operations. The different types of data collection applications may obtain the information in real time. The different types of data collection applications may perform deep packet inspection across various user plane and control plane network interfaces.

The data collection applications may include one or more of the following: simple network management protocol (hereinafter referred to as "SNMP"), Syslog, central processing unit utilization (hereinafter referred to as "CPU utilization"), Netflow, session initiation protocol flow information exchange (hereinafter referred to as "SIPFix"), internet protocol flow information exchange (hereinafter referred to as "IPFix"), subscriber packet data, signaling links, and/or any other type of data collection application.

SNMP may be a protocol used to monitor the activities of network devices. Each network device may have a SNMP interface that may permit analysis center 220 to obtain information regarding the activity of the network device. Syslog may store information associated with computer data logging that may provide information to analysis center 220 regarding the activity of the network. CPU utilization may include information about the amount of time that a network device is active. SIPFix may provide analysis center 220 with information associated with flow rates of data packets and/or the amount of information, associated with SIP data packets, being sent to/from network devices.

IPFix and/or Netflow may provide analysis center 220 with information associated with flow rates of data packets and/or the amount of information, associated with IP data packets, being sent to/from network devices. For example, in an LTE network, IPFix may provide information associated with flow rates of data packets being sent between different network devices. For example, in an LTE network, IPFix may obtain information being sent (e.g., via an S1-U interface) between a serving gateway (hereinafter referred to as "SGW") and a base station. Additionally, or alternatively, in an LTE network, IPFix may obtain information being sent (e.g., via an S11 interface) between mobility management entity device (hereinafter referred to as "MME") and a packet data network (PDN) gateway (hereinafter referred to as PGW).

Subscriber packet data may include information about data packets associated with applications and/or services that are being used by a user of user device 205. Signaling links may provide analysis center 220 with information associated with the set-up, management, and/or tear down of communications between user device 205 and network 240.

The different data collection applications within data collection device 215 may send the information to data memory device 225, for the session between user device 205 and network 240 according to different QoE factors. For example, the QoE factor may be associated with delay, loss, failure, throughput, and/or other types of QoE factors. Data memory device 225 may store the session information based on an identifier for the session. Additionally, or alternatively, data collection device 215 may receive different types of information associated with QoE factors for different types of communications and send the information to data memory device 225.

For example, for a conversational voice communication (between user device 205 and network 240), data collection device 215 may collect information associated with average session setup delay time, average session setup failure rate, average mean opinion score, packet loss rate, jitter, and/or other information. A conversational voice communication may include a voice over LTE communication or a third party over-the-top (OTT) voice over IP (VoIP) communication.

In another example, for an interactive video communication (between user device 205 and network 240), data collection device 215 may collect information associated with average session setup delay time, average session setup failure rate, video opinion score, packet loss, jitter, and/or other information. An interactive video communication may include a video call made using network devices in network 240 or a third party OTT video call.

In another example, for a streaming video communication (between user device 205 and network 240), data collection device 215 may collect information associated with average throughput rates, average session setup delay time, average setup failure rate, average buffering/stalling event rate, average video opinion score, packet loss, and other information. A streaming video communication may include adaptive streaming or a progressive download.

In other examples, such as for Internet browsing communications, machine to machine communication, or other types of IP traffic (between user device 205 and network 240), data collection device 215 may collect information including average throughput rates, average session setup delay time, average session setup failure rate, and/or other information. Data collection device 215 may send the information to data memory device 225.

Additionally, or alternatively, data collection device 215 may send, to data memory device 225, information that includes a timestamp and/or an identifier for the particular coverage area of the network. For example, the identifier may identify an individual cell region within the network, a group of cell regions, or a different category regarding a coverage area of the network. The timestamp information may indicate when the information was collected by data collection device 215.

Process 400 may include analyzing the information about the network (block 420). Analysis center 220 may analyze the information (described with regard to block 410) received from data memory device 225.

Analysis center 220 may derive a daily busy hour for a particular coverage area of the network. The busy hour may be derived by determining a maximum traffic intensity based on several factors, such as average communication time, and the number of attempts to make a communication per unit of time. Analysis center 220 may derive a daily QoE factor (e.g., delay) for a particular type of application (e.g., streaming video) in a particular coverage area (e.g., cell area) within the network during the busy hour of the particular coverage area. Additionally, analysis center 220 may derive a daily non-QoE factor (e.g., flow rates or total power usage within the particular coverage area) for a particular type of application in a particular coverage area within the network during the busy hour of the particular coverage area.

Analysis center 220 may compare the QoE factor, during the busy hour of the particular coverage area with the threshold level associated with the particular QoE factor within the particular coverage area of the network. The threshold level may indicate the maximum value of the QoE factor that may occur during the busy hour of the particular coverage area of the network without any QoE issues occurring for the user (e.g., no sound distortion, pixels appearing within a screen, etc.). In one example implementation, analysis center 220 may compute the threshold level for an interval of time (e.g., busy hour for every hour, every day, every three days, every week, every month, etc.). In another example implementation, device 210 may provide the threshold level to analysis center 220. A user, of device 210, may determine the threshold level for the QoE factor and send the threshold level information, via device 210 to analysis center 220. Different types of communications may have different threshold levels for different QoE factors within the particular coverage area of the network. For example, a threshold level for conversational voice communications, in a particular coverage area of the network, may be different (e.g., greater or less) than a threshold level for streaming video. Additionally, analysis center 220 may compare the non-QoE factor, during the busy hour of the particular coverage area, with the threshold level associated with the non-QoE factor within the particular coverage area of the network.

In some implementations, analysis center 220 may automatically determine, based on the analysis, that additional cells and/or additional channels may be added to the particular coverage area. Analysis center 220 may send a notification to network 240 to implement the requested changes. Network 240 may receive the notification and the network elements may implement the requested changes, such as adding additional cells to the coverage area.

If the capacity threshold is exceeded (block 425—YES), then process 400 may include sending the analysis regarding the network (block 430). For example, analysis center 220 may determine that the QoE factor associated with the daily busy hour exceeds a particular threshold level. Analysis center 220 may send the analysis to analysis memory device 235. Analysis memory device 235 may store the analysis and may send the analysis to device 210. A user (using device 210), may view the analysis and determine (using device 210) how to provide additional capacity to the particular coverage area of the network. The user may determine that additional cells and/or additional channels may be added to the particular coverage area. The user may send, using device 210, a notification to network 240 to implement the requested changes. Network 240 may receive the notification and the network elements within network 240 may implement the requested changes, based on the notification, such as adding additional cells.

If the capacity threshold is not exceeded (block 425—NO), then process 400 may include performing additional analysis (block 435). For example, analysis center 220 may perform additional analysis to predict when the particular coverage area may reach the maximum capacity level for the particular QoE factor.

Analysis center 220 may use different types of analysis to predict when the capacity for a particular coverage area may exceed the threshold level of the particular coverage area. For example, analysis center 220 may use linear regression analysis to determine the predicted time and/or date that the capacity of the particular coverage area may exceed the threshold level for the particular coverage area.

Additionally, or alternatively, analysis center 220 may perform other types of analysis to further refine the prediction. Analysis center 220 may perform pattern matching and/or other types of historical analysis to compare the prediction with other coverage areas of the network. For example, analysis center 220 may analyze historical values for a QoE factor within one or more other coverage areas (such as a cell region). Additionally, or alternatively, analysis center 220 may determine whether there are any patterns or trends associated with the QoE factor in the other coverage areas. For example, analysis center 220 may determine whether, during a busy hour on a particular day (e.g., Monday), the setup delay times for streaming video communications begin to exceed the threshold value for setup delay times for streaming video communications. Additionally, or alternatively, analysis center 220 may perform heuristic or other types of predictive and/or statistical analysis to further refine the prediction.

Additionally, during the analysis, analysis center 220 may include information regarding non-QoE factors and use those values within the different types of analysis, discussed above. For example, analysis center 220 may analyze power consumption (associated with multiple user devices 205) within the particular coverage area to determine when the amount of power consumption will exceed the threshold level for power consumption in the particular coverage area. Analysis center 220 may, for example, analyze flow rates and determine that a trend of increasing flow rates may indicate when the particular type of communication (e.g., Internet browsing) may exceed the threshold level for flow rates in the particular coverage area.

If there is not a match with the previous history (block 440—NO), then process 400 may include sending the analysis (block 445). For example, analysis center 220 may determine that that there is no similarity (e.g., no similar trends or values) between the QoE factor for the other coverage areas and the particular coverage area that is being analyzed. Analysis center 220 may send the analysis to analysis memory device 235. Analysis memory device 235 may store the analysis and may send the analysis to device 210. A user, using device 210, may view the analysis and determine, using device 210, how to provide additional capacity to the particular coverage area of the network. This may include generating or changing rules and/or policies to increase the capacity of the particular coverage area of the network. For example, the user may determine that additional cells may be added to the particular coverage area that will increase the capacity of the particular coverage area and prevent the QoE factor from exceeding the threshold level. The user may send, using device 210, a notification to network 240 to implement the requested changes.

In some implementations, analysis center 220 may automatically make the determination, based on the analysis, whether to provide additional cells or channels for the particular coverage area.

If there is a match with the previous history (block 440—YES), then process 400 may include performing additional analysis (block 450). For example, analysis center 220 may determine that that there is a match between the QoE factor for the other coverage areas and the particular coverage area that is being analyzed. Analysis center 220 may further analyze the information by using pattern matching and/or other historical analysis methods, as described in block 435.

Process 400 may include sending the analysis (block 460). Analysis center 220 may send the analysis to analysis memory device 235. Analysis memory device 235 may store the analysis and may send the analysis to device 210, described with regard to block 445.

While a series of blocks has been described with regard to FIG. 4, the order of the blocks may be modified in other implementations. Further, non-dependent blocks may be performed in parallel.

Figure 5A:
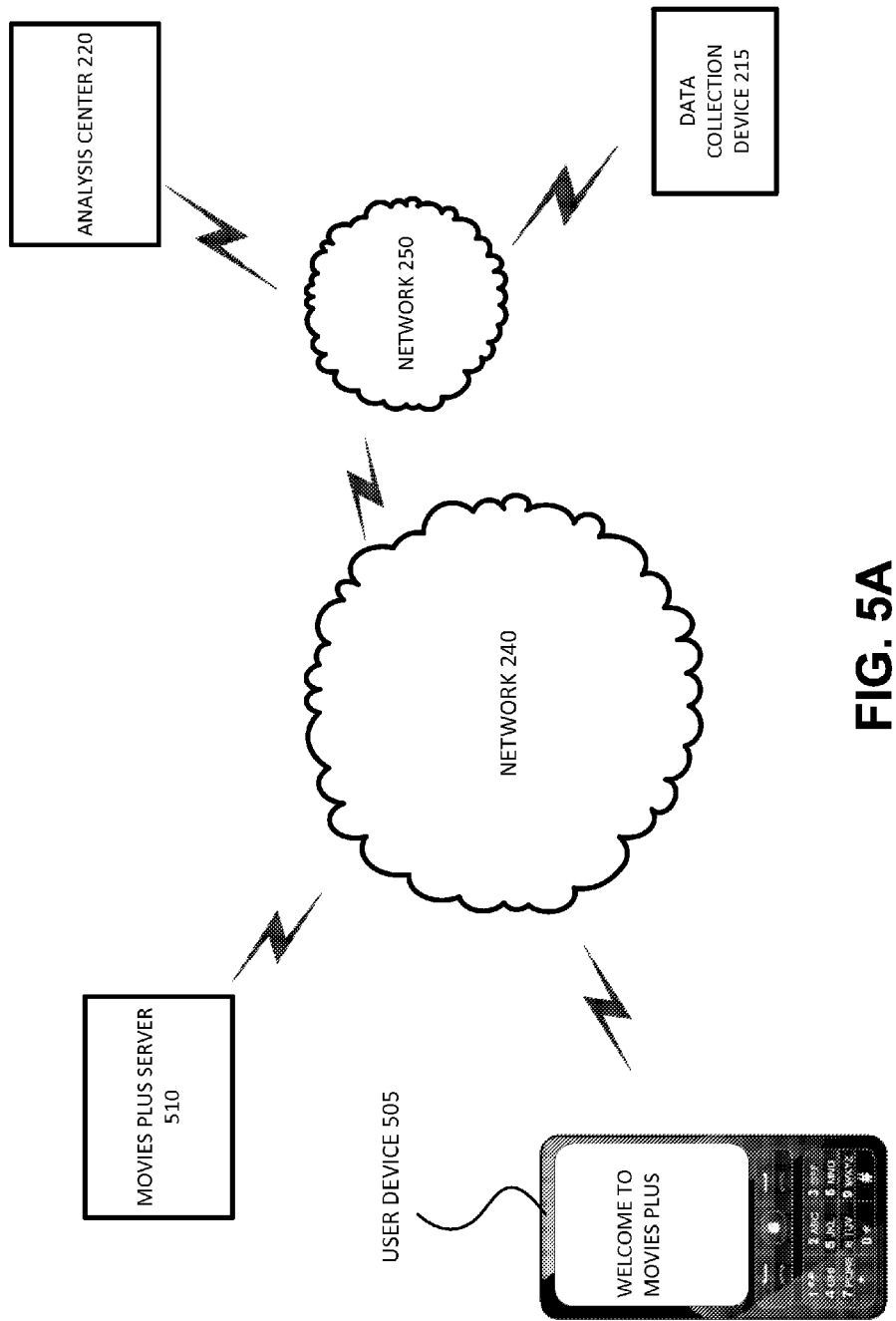
FIGS. 5A-5B are diagrams of example processes for analyzing the capacity of a network.
Figure 5B:
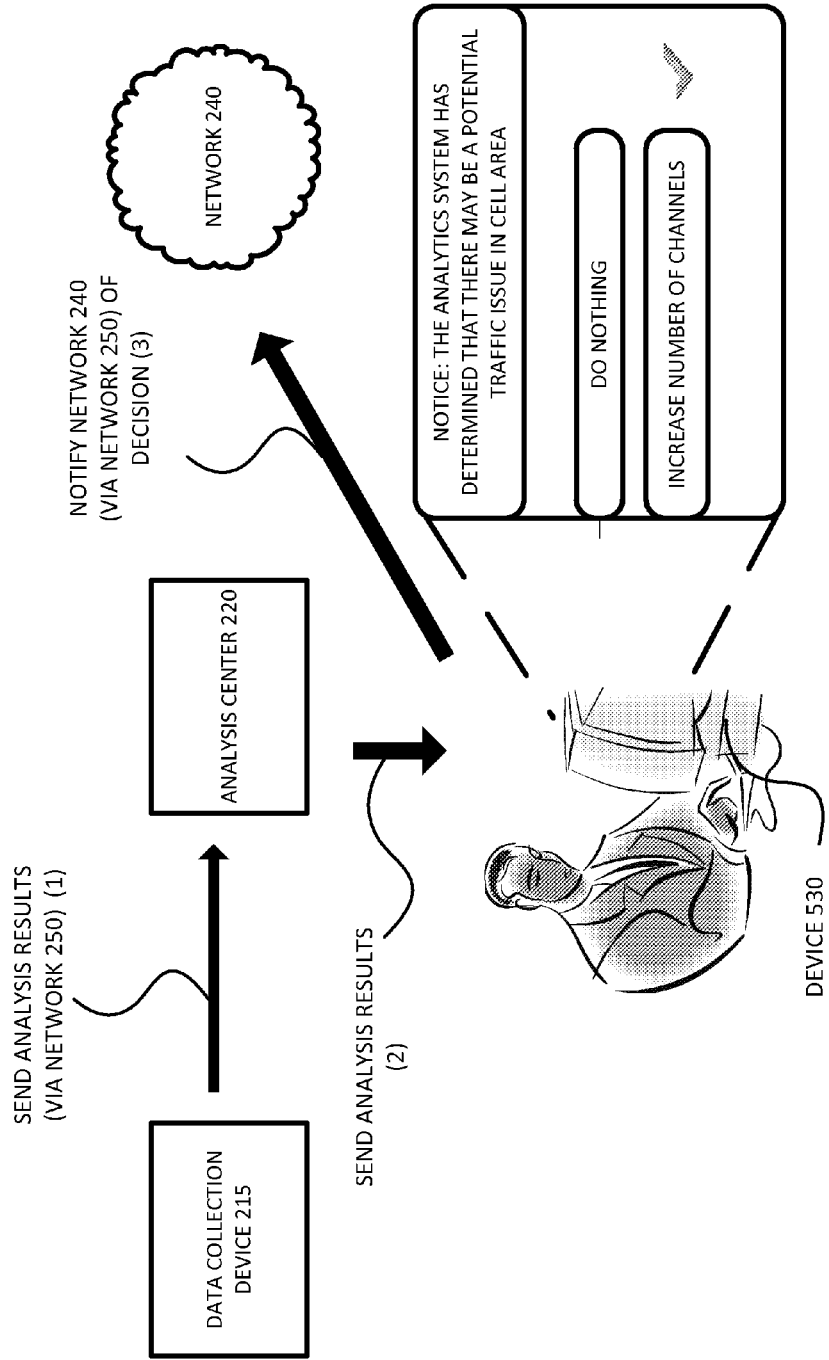

FIGS. 5A-5B are diagrams of example processes for analyzing a network. FIG. 5A shows data collection device 215, analysis center 220, network 240, network 250, user device 505, and Movies Plus server 510. An example of user device 505 may correspond to user device 205, described with regard to FIG. 2. An example of Movies Plus server 510 may correspond to content provider 230. For the purpose of this example, assume that data collection device 215 performs the functions of data memory device 225, and analysis center 220 performs the functions of analysis memory device 235.

As shown in FIG. 5A, a user ("Tom") is using his smart phone (user device 505) to watch movies from Movies Plus. To watch the movie, user device 505 sends a message, via network 240, to Movies Plus server 510, via network 240. As information is being sent to/from network 240, data collection device 215 may be collecting data about the information and sending the data to analysis center 220.

FIG. 5B shows data collection device 215, analysis center 220, network 240, and device 530. An example of device 530 may correspond to device 210, described with regard to FIG. 2. Data collection device 215 may receive information relating to average throughput rates, average session setup delay time, and average session setup failure rate. Data collection device 215 may also receive other network information, such as data flow information and also an identifier identifying the cell in which user device 505 is located.

Data collection device 215 may send the collected information to analysis center 220. Analysis center 220 may analyze the information received from data collection device 215. Analysis center 220 may determine that, at the present time, the average session setup delay time has not reached the threshold level during a busy hour of the day. Through additional analysis, analysis center 220 may predict that, in 36 hours, the average session setup delay time will reach the threshold level.

As shown in FIG. 5B, analysis center 220 may send the prediction to device 530. Device 530 is being used by an employee of the provider of network 240. The employee is able to view a message (sent from analysis center 220) that notifies the employee that the average setup delay time (for streaming videos in that particular coverage area) will exceed the threshold value in 36 hours. The employee decides to select an option to increase the number of channels within the cell region. By selecting the option, device 530 may send a message to network 240 (via network 250) to implement the increased number of channels for the cell region.

As a result, a network may operate more efficiently based on an analysis system that is able to detect when users may experience QoE issues before a QoE factor exceeds the threshold level. With the ability to predict future QoE issues, the network may provide a greater level of QoE to the users of the network.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
a memory; and
one or more processors to:
receive information relating to quality of experience issues;
analyze the information;
predict, based on a result of analyzing the information, that a quality of experience factor, associated with a particular type of communication within a particular coverage area of a network, will exceed a threshold level at a future time;
determine historical values for one or more other coverage areas of the network;
determine that the historical values for the one or more other coverage areas do not match values for the particular coverage area associated with the quality of experience factor after predicting that the quality of experience factor will exceed the threshold level at the future time; and send a message to a device based on predicting that the quality of experience factor will exceed the threshold level at the future time and based on determining that the historical values for the one or more other coverage areas do not match the values for the particular coverage area associated with the quality of experience factor, the device generating or changing a rule or policy associated with the particular coverage area of the network based on the message, and the rule or policy instructing one or more other network devices, in the network, to increase a capacity of the particular coverage area of the network to prevent the quality of experience factor from exceeding the threshold level at the future time.

2. The system of claim 1, where the information includes information identifying a particular session between the network and a user device.

3. The system of claim 1, where the information includes information identifying a streaming video communication between the network and a user device.

4. The system of claim 1, where, when predicting that the quality of experience factor will exceed the threshold value at the future time, the one or more processors are to:
predict an effect that exceeding the threshold level will have on a quality of experience for a user device located in the particular coverage area of the network.

5. The system of claim 1, where, when analyzing the information, the one or more processors are to:
analyze the information by performing linear regression analysis.

6. The system of claim 1, where the information includes:
timestamp information associated with when the information is obtained from the network, and
identifier information for a cell region within the particular coverage area of the network.

7. A method comprising:
receiving, by a network device, information relating to quality of experience issues;
predicting, by the network device and based on the information, that a quality of experience factor, associated with a coverage area, will exceed a threshold level at a future time;
determining, by the network device, one or more historical values for one or more other coverage areas;
determining, by the network device, that the one or more historical values for the one or more other coverage areas do not match one or more values for the particular coverage area associated with the quality of experience factor after predicting that the quality of experience factor will exceed the threshold level at the future time; and
sending, by the network device, a message to a device based on predicting that the quality of experience factor will exceed the threshold level at the future time and based on determining that the one or more historical values for the one or more other coverage areas do not match the one or more values for the particular coverage area associated with the quality of experience factor,
the device generating a notification to prevent the quality of experience issues from occurring after the future time.

8. The method of claim 7, where the information includes: information regarding an interactive video communication between a user device and the network, and
information regarding average session setup delay time and average session setup failure rate.

9. The method of claim 8, further comprising:
analyzing a first portion of the information associated with quality of experience factors, the quality of experience factors including the quality of experience factor; and
analyzing a second portion of the information associated with non-quality of experience factors,
where predicting that the quality of experience factor will exceed the threshold level at the future time includes:
predicting that the quality of experience factor will exceed the threshold level at the future time based on analyzing the first portion of the information associated with the quality of experience factors and based on analyzing the second portion of the information associated with the non-quality of experience factors.

10. The method of claim 9, where the quality of experience factors are associated with delay, loss, and failure issues of the quality of experience issues.

11. The method of claim 7, where predicting that the quality of experience factor will exceed the threshold level at the future time includes:
predicting, based on the information, that the quality of experience factor will exceed the threshold level at the future time by using linear regression.

12. The method of claim 11,
where the information includes information associated with a conversational voice communication, and
where the method further includes:
receiving additional information associated with communications regarding Internet browsing;
analyzing the additional information; and
predicting, based on analyzing the additional information, that another quality of experience factor associated with Internet browsing will reach the threshold level at a different future time.

13. The method of claim 7, where the notification is to increase a number of cells within the coverage area.

14. The method of claim 7, where the notification is to increase a number of channels within the coverage area.

15. A non-transitory computer-readable medium storing instructions, the instructions comprising:
a plurality of instructions, that when executed by one or more processors of one or more network devices, cause the one or more processors to:
receive information relating to quality of experience issues;
analyze the information;
predict, based on a result of analyzing the information, that a quality of experience factor, associated with a particular coverage area of a network, will exceed a threshold level at a future time;
determine one or more historical values for one or more other coverage areas of the network;
determine that the one or more historical values for the one or more other coverage areas do not match one or more values for the particular coverage area associated with the quality of experience factor after predicting that the quality of experience factor will exceed the threshold level at the future time; and
send a message to a device based on predicting that the quality of experience factor will exceed the threshold value at the future time and based on determining that the one or more historical values for the one or more other coverage areas do not match the one or more values for the particular coverage area associated with the quality of experience factor, the device generating or changing a rule or policy based on the message, and the rule or policy instructing one or more other network devices to increase a capacity of the particular coverage area of the network to prevent the quality of experience factor from exceeding the threshold level at the future time.

16. The non-transitory computer-readable medium of claim 15, where the information includes particular information associated with an interactive video, and where the particular information includes an average session setup delay time, an average session setup failure rate, a packet loss rate, and a jitter rate.

17. The non-transitory computer-readable medium of claim 15, where one or more instructions, of the plurality of instructions, to send the message to the device include one or more instructions to:

send a message to the device to increase a number of channels within the particular coverage area of the network.

18. The non-transitory computer-readable medium of claim 15, where sending the message increases a number of cells within the particular coverage area of the network.

19. The non-transitory computer-readable medium of claim 15, where the instructions further comprise:

one or more instructions, that when executed by the one or more processors, cause the one or more processors to:

receive additional information associated with machine to machine communications within the particular coverage area of the network;

analyze the additional information; and predict when another quality of experience factor, associated with the machine to machine communications within the particular coverage area of the network, will exceed a different threshold level at a different future time.

20. The non-transitory computer-readable medium of claim 15, where the one or more instructions to predict include:

one or more instructions, that when executed by the one or more processors, cause the one or more processors to:

predict, based on the result of analyzing the information, that the quality of experience factor will exceed the threshold level at the future time by using linear regression.

\* \* \* \* \*